Feb. 15, 1955   E. L. CALDWELL, JR., ET AL   2,701,942
MACHINE FOR CUTTING AND HARVESTING FORAGE OR THE LIKE
Filed Feb. 16, 1954   5 Sheets-Sheet 1
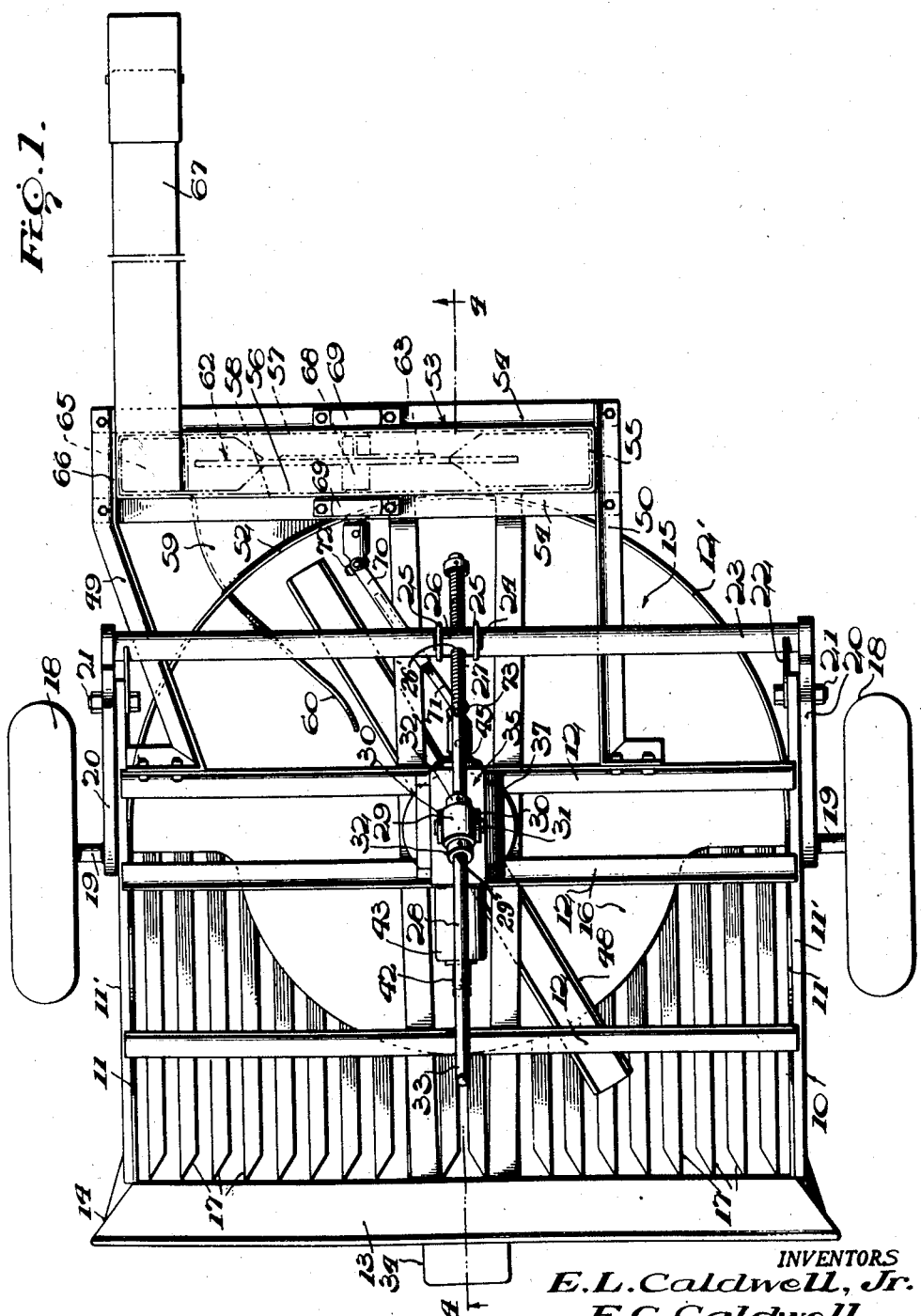
FIG. 1.
INVENTORS
E. L. Caldwell, Jr.
F. C. Caldwell.
ATTORNEY Feb. 15, 1955    E. L. CALDWELL, JR., ET AL    2,701,942
MACHINE FOR CUTTING AND HARVESTING FORAGE OR THE LIKE
Filed Feb. 16, 1954                                    5 Sheets-Sheet 3

INVENTORS
*E. L. Caldwell, Jr.*
*F. C. Caldwell.*
ATTORNEY

Feb. 15, 1955   E. L. CALDWELL, JR., ET AL   2,701,942
MACHINE FOR CUTTING AND HARVESTING FORAGE OR THE LIKE
Filed Feb. 16, 1954   5 Sheets-Sheet 4

INVENTORS
E. L. Caldwell, Jr.
F. C. Caldwell.
ATTORNEY

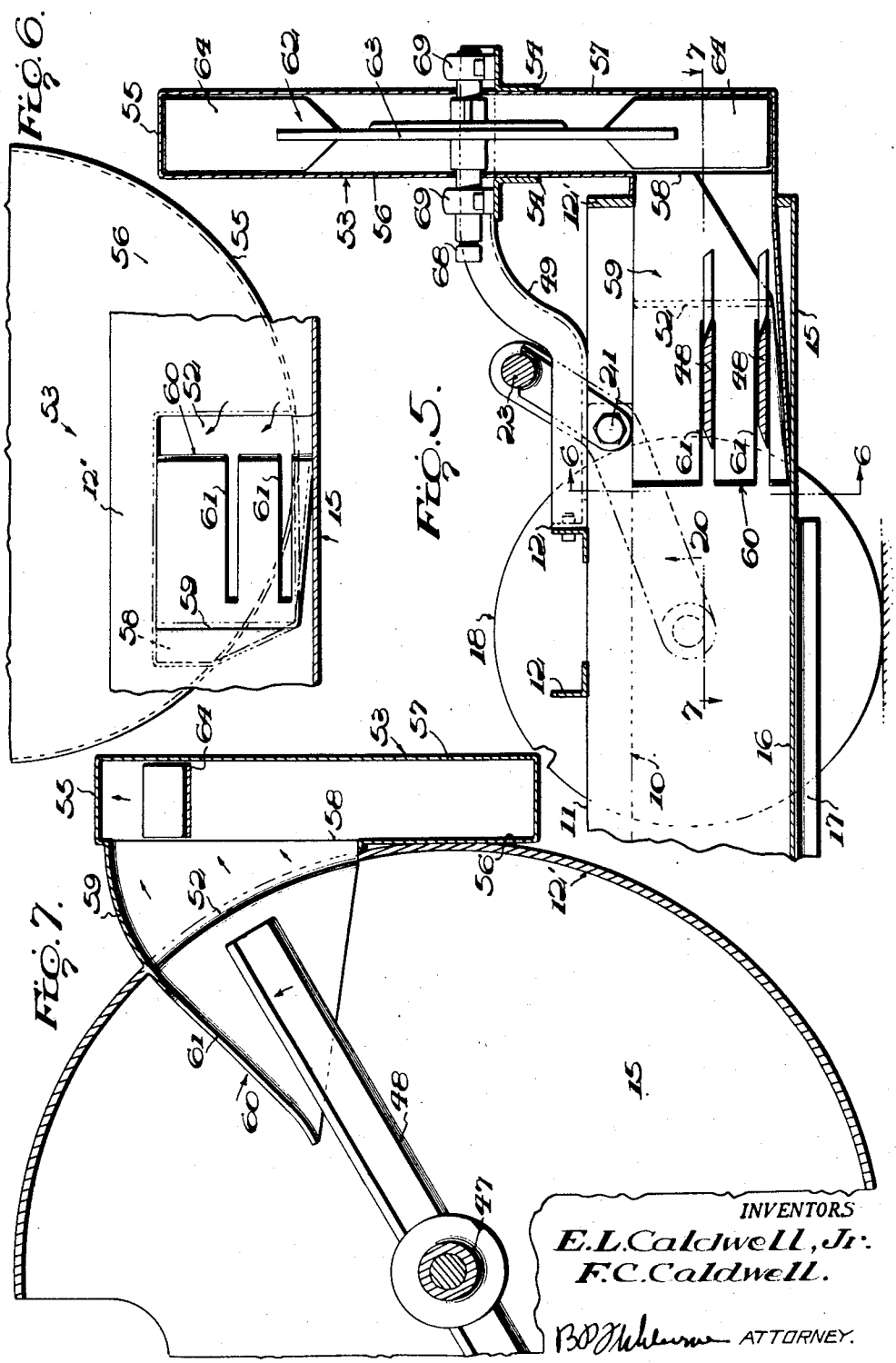

United States Patent Office 2,701,942
Patented Feb. 15, 1955

2,701,942

MACHINE FOR CUTTING AND HARVESTING FORAGE OR THE LIKE

Edward L. Caldwell, Jr., and Frederick C. Caldwell, Corpus Christi, Tex., assignors to E. L. Caldwell & Sons, Corpus Christi, Tex.

Application February 16, 1954, Serial No. 410,628

4 Claims. (Cl. 56—23)

The present invention relates to a machine for cutting and harvesting various types of material, such as forage, grass, wheat, oats or the like.

An important object of the invention is to provide a machine of the above-mentioned character which will properly cut the material, in rows or broadcast and deliver the same with a minimum waste to a rotary blower which in turn will discharge the same to a suitable point.

A further object of the invention is to provide means to prevent the cut material from dropping upon the ground, and also to present the action of the fan from sucking dirt and other undesirable material into the presence of the cut material, which is to be transferred to a suitable point.

A further object of the invention is to provide a machine of the above-mentioned character which may be attached to a tractor and will have its operating parts driven from the power take-off of the tractor, while the operating parts may be driven from a separate source of power, if desired.

A further object of the invention is to provide means for raising and lowering the operating parts of the machine to cut the material at different elevations.

A further object of the invention is to provide simple driving means for rotating the rotary cutter and the rotary fan element in proper directions with relation to each other.

Other objects and advantages will be apparent during the course of the following description.

Figure 2:
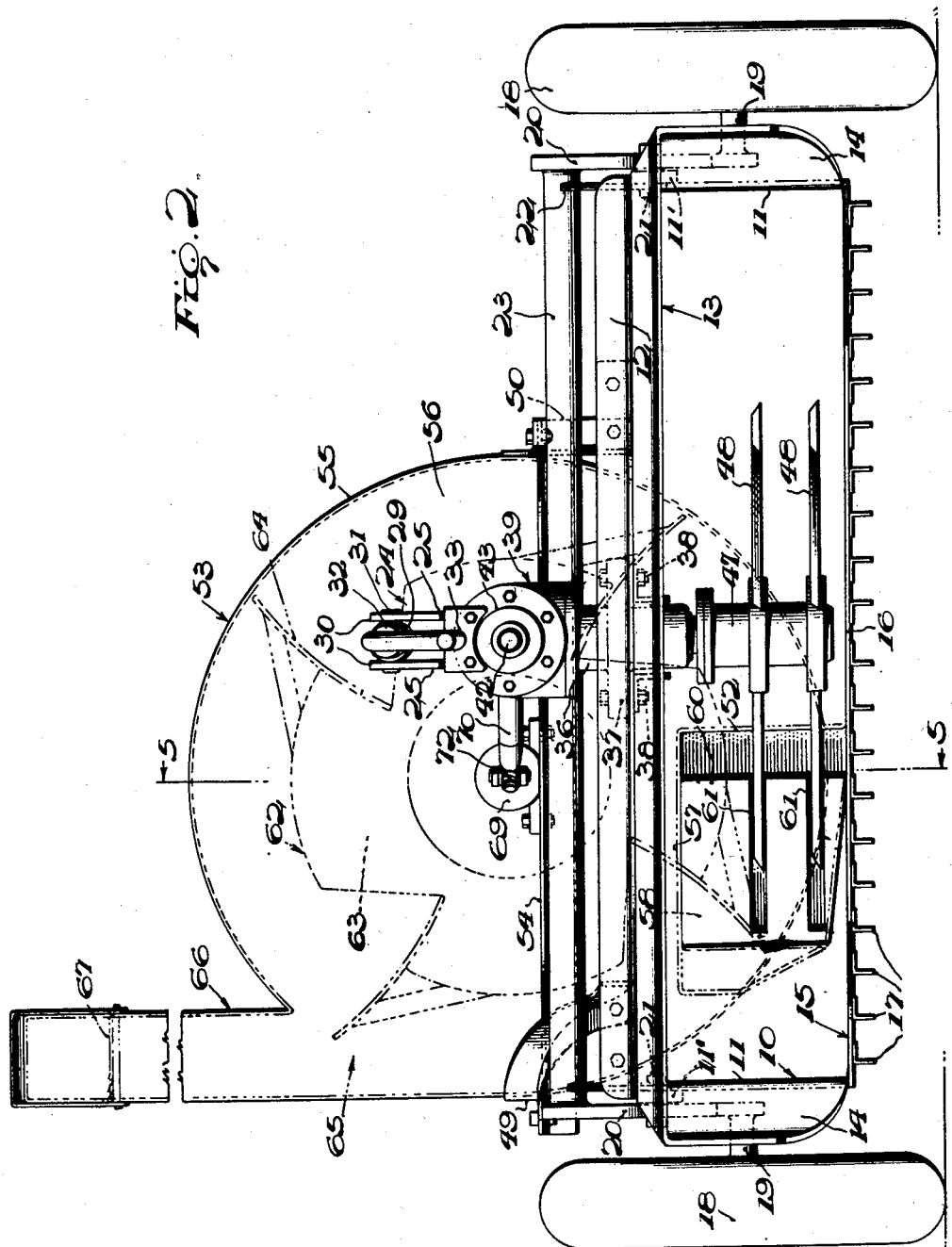
Figure 3:
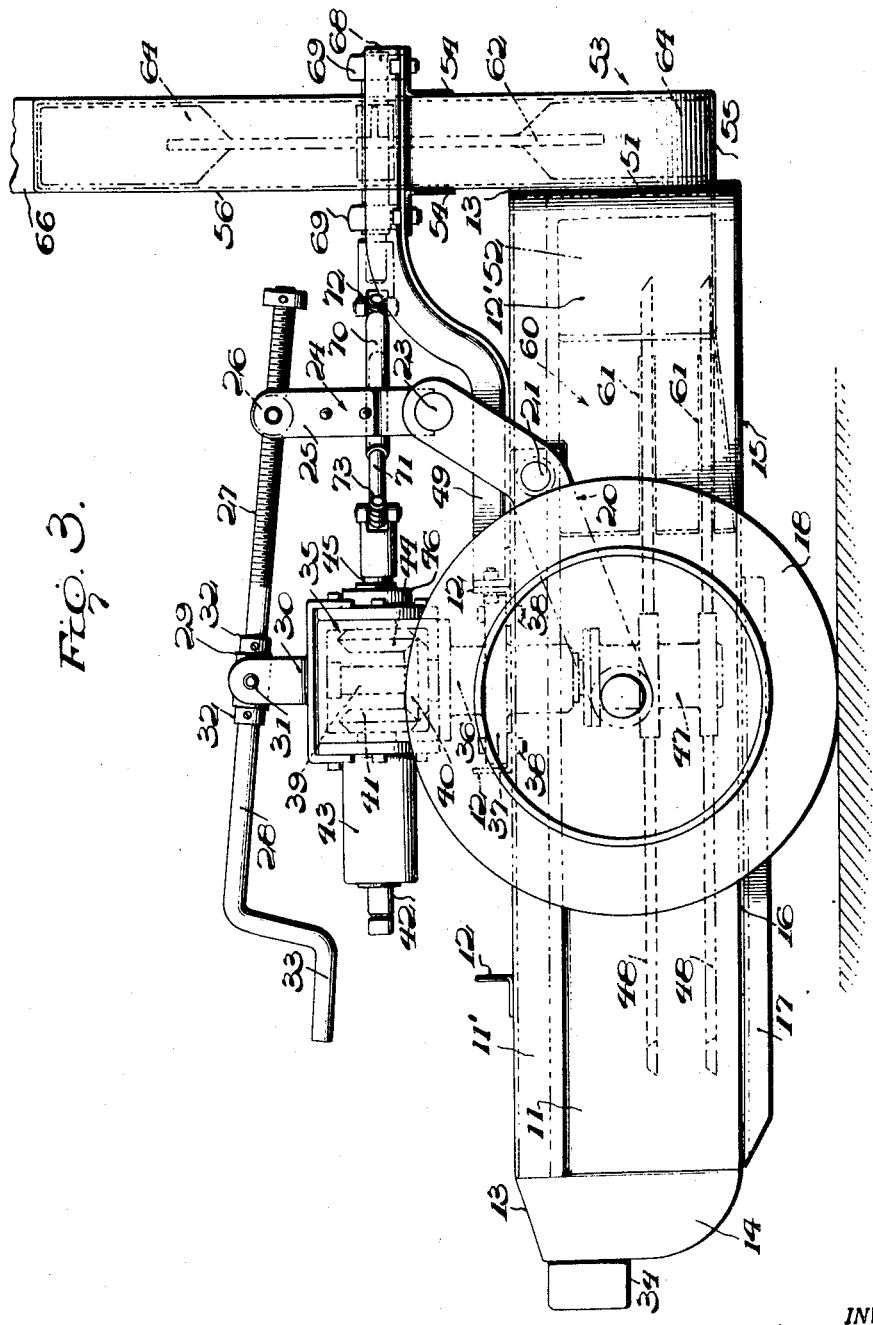
Figure 4:
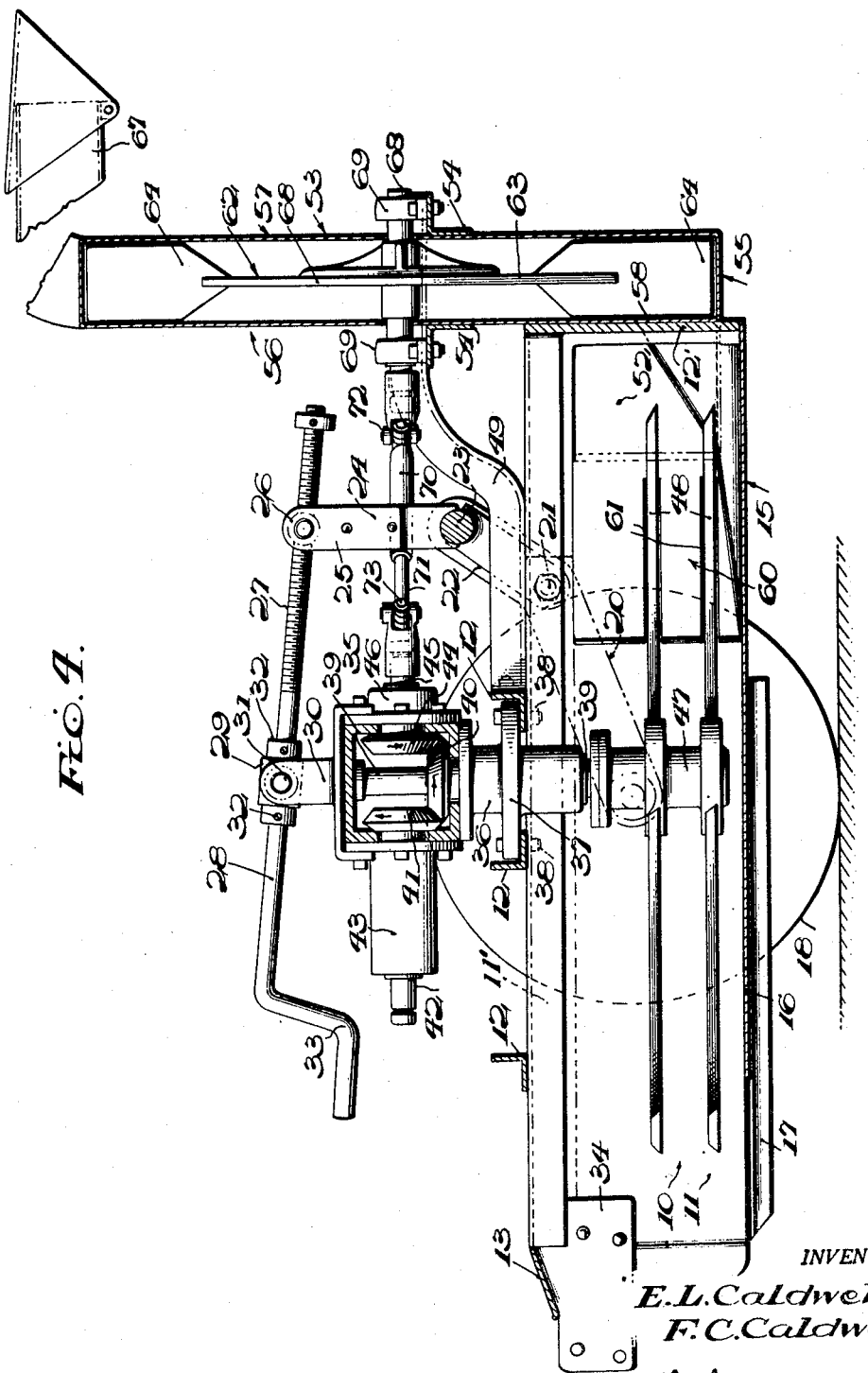

In the accompanying drawings forming a part of this application and in which like numerals are employed to designate like parts throughout same, Figure 1 is a plan view of a machine embodying the invention, Figure 2 is a front end elevation of the machine, enlarged with respect to Figure 1, Figure 3 is a side elevation of the machine, enlarged with respect to Figure 1, Figure 4 is a vertical longitudinal section taken on line 4—4 of Figure 1, enlarged with respect to Figure 1, Figure 5 is a vertical section taken on line 5—5 of Figure 2, Figure 6 is a vertical section taken on line 6—6 of Figure 5.

Figure 7 is a horizontal section taken on line 7—7 of Figure 5.

In the drawings, where for the purpose of illustration is shown a preferred embodiment of the invention, the numeral 10 designates a casing, as a whole, including sides 11, rigidly secured to horizontal side bars 11', in turn rigidly connected with transverse angle irons 12. At their forward ends, the sides 11 carry a forwardly diverging extension 13, rigidly secured thereto. The extension 13 includes sides 14 and the bottom of the extension is open, as shown. The top of the casing including the sides 11 may be open while its bottom is covered by an imperforate bottom sheet 15, which is substantially semi-circular and carries a front imperforate extension 16, which is also substantially semi-circular but of a smaller diameter than the bottom. The bottom sheet 15 is rigidly secured to the sides 11 and extends rearwardly beyond these sides. The sides 11 are continued rearwardly in the form of an end extension 12', which is circularly curved and conforms to the curvature of the bottom plate 15 and is rigidly attached to such bottom plate. The casing 10 therefore has a rear reduced or curved end.

Extending forwardly beyond the bottom extension 16 are spaced horizontal longitudinal tines 17, which are arranged beneath the bottom portion 15 and extension 16 and are rigidly secured thereto. These tines 17 have their upper surfaces arranged close to the upper faces of the bottom extension 16 and bottom plate 15 to deliver the cut material to these upper faces.

The casing or frame 10 is rigid and is supported at a suitable elevation with respect to the ground by means of wheels 18, rotatably mounted upon axles 19, rigidly secured to the long arms of bell cranks 20, which are pivotally mounted upon pivot elements or bolts 21, Figure 3, secured to the rear ends of the bars 11'. The bell cranks 20 have their upper ends rigidly connected by a transverse rod 23, as shown. When the rod 23 is shifted longitudinally of the machine, the bell cranks will be turned upon their pivots and the casing of the machine will be raised and lowered. The means to move the shaft longitudinally of the machine includes an upstanding crank 24 rigidly mounted thereon and this crank includes upstanding sides 25, having a cylinder or block 26 arranged between the same and pivotally connected therewith to turn vertically. This cylinder or block 26 has a screw-threaded opening 26', Figure 1, formed transversely thereof for receiving the screw-threaded portion 27 of a shaft 28. This shaft 28 has a smooth portion rotatably mounted within the transverse opening 29', Figure 1, formed in a cylinder or block 29, arranged between upright bearings 30, having trunnions 31 pivotally mounted in bearings 30. Collars 32 are rigidly mounted upon the shaft 28 and engage opposite sides of the cylinder or block 29 to prevent longitudinal movement of the shaft 28 with respect to the block. The forward end of the shaft 28 is equipped with a hand crank 33 by means of which the shaft 28 may be turned.

A coupling 34 is secured to the forward end of the casing 10, at the transverse center of the casing, adjacent to the top extension 13, and is rigidly secured to the top extension and parts of the casing. This coupling is adapted for connection with a draft appliance which is to be secured to a tractor or the like.

The numeral 35 designates a vertical gear case, upon the top of which the bearings 30 are rigidly mounted. This gear case is rigidly mounted upon a tubular extension 36, forming a bearing. This tubular extension or bearing 36 is provided with a horizontal substantially square plate 37, integral therewith, and this plate is mounted upon and between the intermediate angle irons 12 and is rigidly secured thereto by bolts 38 or the like. The vertical shaft 39 is mounted in the bearing 36 and extends into the gear case 35 and has a horizontal bevel-gear 40 rigidly mounted thereon. This bevel-gear is engaged and driven by a vertical bevel-gear 41, mounted upon a horizontal longitudinal shaft 42, mounted in a horizontal bearing 43, secured to the gear case 35, upon its forward side. The shaft 42 is rotated counter-clockwise as viewed from the forward end of the machine and may receive its rotation from the power take-off of the tractor, although it may be driven by a different source of power. The bevel-gear 41 rotates counter-clockwise, viewed from the front end of the machine, and drives the horizontal bevel-gear 40 counter-clockwise, viewed from the top of the machine, and the bevel-gear 40 engages and drives a rear vertical bevel-gear 44, rigidly mounted upon a horizontal shaft 45. The shaft 45 is journaled in a bearing 46. The bevel-gear 40 rotates the bevel-gear 44 clockwise as viewed from the front end of the machine and the shaft 45 is accordingly rotated clockwise, as viewed from the front end of the machine, as shown.

The vertical shaft 39 extends below the bearing 36 and has a coupling head 47 rigidly secured thereto and this coupling head carries upper and lower blades 48. These blades are rotating counter-clockwise, as viewed from the top of the machine.

Supporting bars 49 and 50, are horizontally arranged and rigidly mounted upon the rear angle iron 12 and hence rigidly secured to the casing. These supporting bars extend rearwardly, as shown, and have their rear ends elevated. The end 12' has an opening 52 formed therein near the left side of the casing, as viewed from the front of the machine, as clearly shown in Figures 1, 6 and 7.

Rigidly mounted upon the bars 49 and 50 is a vertical fan casing 53, which may be supported by transverse angle irons 54, secured to the bars 49 and 50. This vertical fan casing is disposed rearwardly of the end 12'. The vertical fan casing 53 is transversely horizontally offset with respect to the vertical shaft 39. The fan casing includes a closed circumferential portion 55 and forward and rear ends 56 and 57, and the forward end 56 has an opening 58 which is in communication with the opening 52. The opening 58 is at the bottom of the fan casing, Figures 2 and 6, and a conduit or pipe 59 leads from the opening 58 to the opening 52. This conduit has an inclined bottom which conducts the material from the casing 10 to the fan casing. Disposed inwardly of the end 12' is a guard 60, arranged in the path of travel of the blades 48, and this guard has horizontal slots 61 for the passage of the blades 48. The guard 60 is inclined with respect to the longitudinal axis of the machine and serves to deflect the cut material rearwardly, as it is acted upon by centrifugal force, due to the rapid rotation of the blades, and this cut material passes through the conduit 59 having the inclined bottom and through the opening 58 into the fan casing 53 at the bottom of the fan casing.

A rotary fan 62 is mounted within the casing 53 and includes a disc 63 carrying blades 64, rigidly secured to the disc. These blades are slightly longitudinally curved and are inclined at their outer ends in the direction of rotation of the fan. The blades 64 are rigidly secured to the disc 63 by any suitable means. The blades 64 rotate in close relation to the periphery of the fan casing 53, and sweep across the opening 58. The rotating fan draws the air in through the opening 58. The fan casing has an outlet opening 65, Figure 2, which is above the opening 58 and is at the left of the casing, viewed from the front of the machine, and at the periphery 55. The opening 65 leads into a conduit 66, which extends upwardly and leads into a horizontal conduit 67, which may discharge the material at any suitable point, such as in a vehicle, not shown, trailing at the rear of the machine. The air current caused by the rotating fan draws the cut material rearwardly upon the bottom plate 15 and into the fan casing, and discharges it upwardly through the fan casing into the outlet 65. The traveling fan blades may also contact with the cut material suspended in the air current, aiding in raising it. The bottom plate 15 not only prevents the cut material from dropping upon the ground but also prevents the action of the fan from picking up dirt or other objectionable material and introducing it into the fan casing with the proper cut material.

The disc 63 is rigidly mounted upon a horizontal shaft 68, extending longitudinally of the machine. This shaft is journaled in stationary bearings 69, mounted upon the angle irons 54. The shaft 68 is rotated by a longitudinally extensible drive shaft including sections 70 and 71, which telescope each other and rotate together. The section 70 has driving connection with the shaft 68 by a universal joint 72 of any well-known or preferred construction, and the shaft section 71 has connection with the shaft 45, by a universal joint 73 of any well-known construction.

The operation of the machine is as follows:

The machine may be arranged at the rear of a tractor and is attached to the tractor by the usual draft appliance which is secured to the coupling element 34. The elevation of the blades 48 with respect to the ground is adjusted by operating the shaft 28. The blades rotate horizontally at a high speed in a counter-clockwise direction, viewed from the top of the machine. As the machine is drawn forwardly behind the tractor, the forage or other plants pass between the spaced tines 17 and project above the same, and move into the path of travel of the rapidly rotating blades 48, which sever the plants and also move them rearwardly. This cut material is advanced rearwardly by the blades and the action of the air currents traveling toward the fan casing and is deposited upon the bottom plate 15. The cut material upon the bottom plate is acted upon by the air currents traveling toward the fan case and centrifugal action due to the rapid rotation of the blades and the cut material moves toward the opening 52 and passes with the air current through this opening and through the conduit 59 and through the opening 58 and enters the fan casing near its bottom. Any cut material tending to remain upon the blades, as the blades approach the guard 60, are scraped from the blades by the guard, and are acted upon by centrifugal force and move radially outwardly along the blades, and are deflected into the opening 52. This guard deflects the air current and all cut material into the fan casing. The air current with the cut material suspended therein travels upwardly in the fan casing and is discharged through the opening 65. The cut material is shifted rearwardly by the blades 48 and is deposited upon the imperforate bottom 15, and is also moved rearwardly upon this bottom, to some extent, by the rotating blades 48. The shaft 39 is arranged above and opposite the bottom 15, and near its center, and this locates the blades 48 above and opposite the bottom 15. The cut material is moved rearwardly by the combined action of the blades 48 and the suction from the fan casing through the conduit 59. The air suction in the rearward direction is strong, since the bottom 15 is imperforate. The guard 60 is inclined and is arranged near the opening 52 to deflect the cut material into the conduit 59. The blades 64 of the vertical fan sweep across the outlet end of the conduit 59, and aid the air suction in moving the severed material through the fan casing toward the outlet opening 65. The vertical shaft 39 is driven by the horizontal bevel gear 40, driven by the vertical bevel gear 41, carried by the power take-off shaft 42. The shaft 68 of the vertical fan is horizontal, and is driven from the vertical bevel gear 44, through the self-adjusting driving connecting means including elements 70 and 71. The bevel gear 44 engages and is driven by the bevel gear 40. The gears are arranged in the gear case 35. The entire apparatus is hooked onto the end of a tractor, not shown, and the arrangement of the gearing including the gears 40, 41 and 44, is such that power may be taken from the power take-off of the tractor to drive both the vertical shaft 39 and the horizontal shaft 68.

It is to be understood that the form of the invention herewith shown and described is to be taken as a preferred example of the same and that various changes in the shape, size and arrangement of parts may be resorted to without departing from the spirit of the invention or the scope of the subjoined claims.

Having thus described the invention, it is claimed:

1. A machine for cutting forage or other plants, comprising a substantially horizontal casing having its forward vertical end open, said casing including substantially vertical sides and a substantially vertical curved rear end, said rear end having an outlet opening formed therein, said casing including a bottom which extends to the rear end, said bottom being substantially semi-circular and including a reduced forward extension which is substantially semi-circular, said bottom and bottom extension being spaced rearwardly from the forward open end of the casing, wheel means having the casing mounted thereon so that the casing may travel in the desired direction, spaced tines supported adjacent to said bottom to move therewith and extending longitudinally of the direction of travel of the casing and projecting forwardly beyond the bottom extension, a vertical shaft mounted upon the casing and arranged opposite to and above said bottom and near the center of the bottom, a horizontally rotating cutter arranged within the casing and mounted upon the vertical shaft, said cutter including blades, said blades being disposed opposite to and above the bottom, the ends of the blades traveling close to the curved substantially vertical end of the casing when the blades are in the rear position and projecting forwardly beyond the bottom extension when in the forward position and traveling over said tines, said blades and tines coacting to sever the forage or plants which are swept rearwardly by the blades upon said bottom and moved rearwardly upon said bottom by said blades, and means to drive the vertical shaft.

2. A machine for cutting forage or other plants, comprising a substantially horizontal casing having its forward vertical end open, said casing including substantially vertical sides and a substantially vertical curved rear end, said rear end having an outlet opening formed therein, said casing including a bottom which extends substantially to the sides and rear end and is spaced rearwardly from the forward open end of the casing, wheel means having the casing mounted thereon so that the casing may travel in the desired direction, spaced tines supported adjacent to said bottom to move therewith and extending longitudinally of the direction of travel of the casing and projecting forwardly beyond the bottom, a vertical shaft mounted upon the casing and arranged opposite to and above the bottom and near the center of the bottom, a horizontally rotating cutter arranged within the casing and mounted upon the vertical shaft, said cutter including blades, said blades being disposed opposite to and above the bottom, the ends of the blades traveling close to the curved substantially vertical end of the casing when the blades are in the rear position and projecting forwardly beyond the bottom when in the forward position and traveling over said tines, said blades and tines coacting to sever the forage or plants which are swept rearwardly by the blades upon said bottom and moved rearwardly upon said bottom by said blades, means to drive the vertical shaft, a vertical fan casing arranged near the rear curved end of the horizontal casing and secured to the horizontal casing and extending transversely of the direction of travel of the horizontal casing, said vertical fan casing including ends, a conduit connected with one end of the fan casing and leading into the fan casing and having its opposite end in communication with the outlet opening of the rear curved end of the horizontal casing, a vertical fan rotatably mounted within the vertical fan casing and including blades to sweep across the outlet end of the conduit, said fan casing having an outlet opening near its top, and means to drive the vertical fan.

3. A machine for cutting forage or other plants, comprising a substantially horizontal casing having its forward vertical end open, said casing including substantially vertical sides and a substantially vertical curved rear end, said rear end having an outlet opening formed therein, said casing including a bottom which extends substantially to the sides and rear end and is spaced rearwardly from the forward open end of the casing, wheel means having the casing mounted thereon so that the casing may travel in the desired direction, spaced tines supported adjacent to said bottom to move therewith and extending longitudinally of the direction of travel of the casing and projecting forwardly beyond the bottom, a vertical shaft mounted upon the casing and arranged opposite to and above the bottom and near the center of the bottom, a horizontally rotating cutter arranged within the casing and mounted upon the vertical shaft, said cutter including blades, said blades being disposed opposite to and above the bottom, the ends of the blades traveling close to the curved substantially vertical end of the casing when the blades are in the rear position and projecting forwardly beyond the bottom when in the forward position and traveling over said tines, said blades and tines coacting to sever the forage or plants which are swept rearwardly by the blades upon said bottom and moved rearwardly upon said bottom by said blades, a guard arranged above and opposite to said bottom and adjacent to the outlet opening formed in the curved rear end and inclined with respect to such opening to deflect the severed material upon said bottom and toward said outlet opening, said guard having opening means for the passage of the blades of the rotary cutter, and means to drive the vertical shaft.

4. A machine for cutting forage or other plants, comprising a substantially horizontal casing having its forward vertical end open, said casing including substantially vertical sides and a substantially vertical curved rear end, said rear end having an outlet opening formed therein, said casing including a bottom which extends substantially to the sides and rear end and is spaced rearwardly from the forward open end of the casing, wheel means having the casing mounted thereon so that the casing may travel in the desired direction, spaced tines supported adjacent to said bottom to move therewith and extending longitudinally of the direction of travel of the casing and projecting forwardly beyond the bottom, a vertical shaft mounted upon the casing and arranged opposite to and above the bottom and near the center of the bottom, a horizontally rotating cutter arranged within the casing and mounted upon the vertical shaft, said cutter including blades, said blades being disposed opposite to and above the bottom, the ends of the blades traveling closes to the curved susbtantially vertical end of the casing when the blades are in the rear position and projecting forwardly beyond the bottom when in the forward position and traveling over said tines, said blades and tines coacting to sever the forage or plants which are swept rearwardly by the blades upon said bottom and moved rearwardly upon said bottom by said blades, a guard arranged above and opposite to said bottom and adjacent to the outlet opening formed in the curved rear end and inclined which respect to such opening to deflect the severed material upon said bottom and toward said outlet opening, said guard having opening means for the passage of the blades of the rotary cutter, means to drive the vertical shaft, a vertical fan casing arranged near the curved end of the horizontal casing and secured to the horizontal casing and extending transversely of the direction of travel of the horizontal casing, said vertical fan casing including ends, a conduit connected with one end of the vertical fan casing and leading into the fan casing and having its opposite end in communication with the outlet opening of the rear curved end of the horizontal casing, a vertical fan rotatably mounted with the vertical fan casing and including blades to sweep across the outlet end of the conduit, said fan casing having an outlet opening near its top, and means to drive the vertical fan.

References Cited in the file of this patent

UNITED STATES PATENTS

| Number | Name | Date |
| --- | --- | --- |
| 1,189,519 | Word | July 4, 1916 |
| 1,370,919 | Schaefer | Mar. 8, 1921 |
| 2,491,544 | Arkenberg | Dec. 20, 1949 |
| 2,579,013 | Sampson | Dec. 18, 1951 |
| 2,641,100 | Sylvester | June 9, 1953 |
| 2,649,678 | Sishc | Aug. 25, 1953 |